Sept. 17, 1935.  J. M. CRAWFORD ET AL  2,014,425

REAR BEARING CAP

Filed Aug. 14, 1929

Inventors
James M. Crawford &
Harlie K. Hicks
By
Attorneys

Patented Sept. 17, 1935

2,014,425

UNITED STATES PATENT OFFICE 2,014,425

REAR BEARING CAP

James M. Crawford and Harlie H. Hicks, Detroit, Mich., assignors to General Motors Corporation, Detroit, Mich., a corporation of Delaware Application August 14, 1929, Serial No. 385,896

14 Claims. (Cl. 184—13)

This invention relates to lubricating systems and has particular reference to the lubrication of a bearing of the crankshaft of an internal combustion engine of an automotive vehicle.

The invention is particularly concerned with an internal combustion engine such as is used on the Chevrolet automobile and relates more particularly to the rearmost bearing of the crankshaft, although it is adaptable to the other bearings as well.

On the Chevrolet engine, the rearmost crankshaft bearing in the engine block is provided with an oil pocket or receptacle over the bearing and a tube, extending well above the bottom of the pocket, conducts the lubricant to the bearing. The tube is for the purpose of allowing the settling of foreign matter in the bottom of the pocket and to keep it away from the bearing. After the lubricant has reached the bearing, it will spread over the bearing surface and leave the bearing at the two ends. On the inner end of the crankshaft, the disposition of the oil is no problem for the reason that it flows back directly into the crankcase, but at the rearward end of the shaft some arrangement must be made to collect and retain the oil which seeps from the bearing. Accordingly, there is formed on the engine block or crankcase, an oil-retaining groove which surrounds the end of the crankshaft at the end of the bearing. An annular flange or rib is placed on the crankshaft and has its rearmost portion closely adjacent the edge of the oil-retaining groove. As the crankshaft rotates, the centrifugal force will throw the oil from the rib into the groove from where it will flow to the groove's bottom and return to the crankcase through the passage or trap in the lower or cap portion of the bearing.

In prior constructions, the passage in the cap at the bottom of the crankcase was straight or inclined to allow for a ready return of oil to the crankcase but it was found that the rapid rotation of the crankshaft caused the oil fin of the connecting rod to create an air current which forced the oil back into the groove and caused it to fall into the clutch housing which interfered with the efficient operation of the clutch. In the present invention, the oil passage is replaced by a trap which is angular and always retains a portion of the oil at its bottom to prevent any flow of oil or air from the crankcase interior to the exterior.

Under normal conditions when the automobile is running on substantially horizontal ground or when the engine is but slightly inclined, there will be but slight tendency for the oil to gather at the rear end of the crankcase and there will be no flow through the oil trap to the clutch housing. When the automobile is running up a rather steep grade, the engine is considerably inclined and unless some means were provided the oil would run to the rear end of the crankcase and flow through the oil trap to the clutch housing. To prevent this flow of oil, a ball check valve is provided at the inner side of the trap and a pin is applied to retain a ball in the trap. When the engine is in an inclined position, the ball will roll rearwardly into a conical portion of the trap to prevent inflow of oil from the crankcase.

Figure 1:
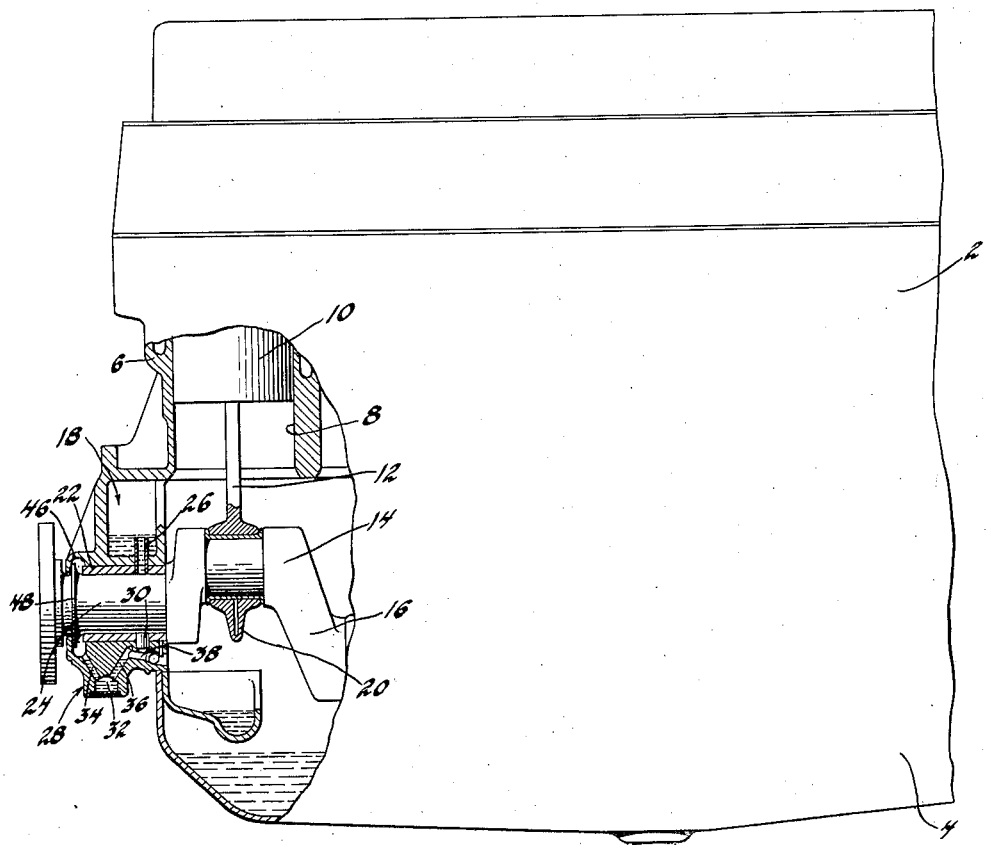
Figure 1 shows a side view of an internal combustion engine with a portion broken away and parts therebeneath shown in section to show the application of the invention.

Referring to the drawing, the numeral 2 indicates an internal combustion engine having the crankcase 4 positioned at the lower portion of the engine block 6. The engine block is provided with the usual plurality of cylinders 8 and pistons 10 which operate the connecting rods 12 connected to the throws 14 of the crankshaft 16.

At the rear of the engine and over the rearmost bearing the engine block is provided with an oil pocket 18 which is adapted to receive oil as it is thrown about in the crankcase by the crankshaft and by the fins 20 on the connecting rod 12. A bearing 22 is positioned between the crankshaft bearing portion 24 and the rear end of the engine block or the crankcase. A tube 26 passes through an opening in the bottom of the oil pocket 18 and through an opening in the bearing 22 and extends a substantial distance above the bottom of the oil pocket 18. The purpose of this tube is to permit any impurities in the oil to settle to the bottom of the pocket 18 and allow only clean oil to flow through the tube 26 to the bearing surface between parts 22 and 24.

A bearing cap 28 is secured by means of bolts (not shown) to the bottom of the engine block 6 to retain the bearing 22 and crankshaft 16 in the engine block. The bearing 22 and the cap 28 are provided with openings for the reception of a dowel pin 30 to hold the bearing 22 in position.

An oil trap 32 comprising the inclined passages 34, 36 and 38 and the well 40 is formed in the cap 28 and communicates at its inner end 42 with the interior of the crankcase. The end passage 38 is inclined downwardly when the engine is in normal position and is also normally above the level of the oil in the oil pan 4. At its outer end 44 it communicates with an oil groove 46 formed in the engine block and the cap 28.

The crankshaft is provided with an annular rib or flange 48 which extends part way into the groove 46 and is positioned relatively close to the outer edge of the groove as shown in Figure 1. As the oil from the tube 26 reaches the bearing, it will spread and gradually find its way to the two ends of the bearing. From the inner end, the oil will drop into the crankcase while from the outer or rearward end, the centrifugal force will cause the rib 48 to throw the oil outwardly against the oil groove 46 from where it will flow into the passage 34 of the trap 32 to be returned to the crankcase.

Figure 2:
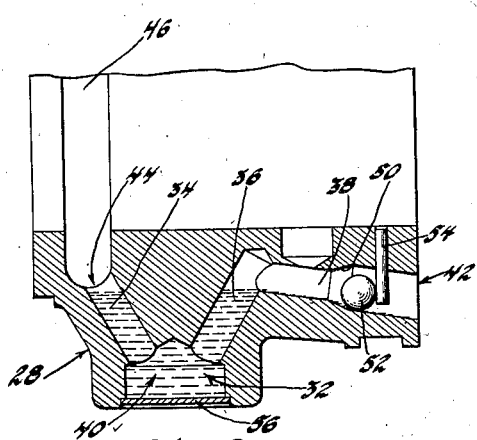
Figure 2 is an enlarged sectional view of the bottom of the bearing.
Figure 3:
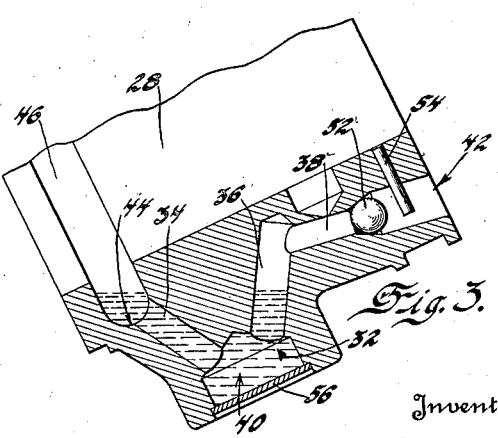
Figure 3 is a view corresponding to Figure 2 but with the bearing in an inclined position which corresponds to the position of the engine when the automobile is climbing a grade.

From an examination of Figure 2, it will be apparent that when the engine is in a normal horizontal position the oil in the trap will flow to the crankcase from the opening at 42. However, should the automobile be moving up a steep incline and the engine become tilted as shown in Figure 3, the oil in the crankcase will flow to the rear thereof and if no means were provided would flow into the end 42 through the trap 32 and out at the end 44 into the clutch housing. To prevent this flow of oil when the engine is in the position shown in Figure 3, the trap is provided with a tapered portion 50 on which there is adapted to seat a ball 52 as shown in Figure 3. It will be apparent from an examination of Figures 2 and 3 that when the engine changes from the position of Figure 2 to that of Figure 3, the ball 52 will roll from the position of Figure 2 to the position in Figure 3 and into the conical portion 50 to effectively block any flow of oil from the crankcase into the end 42 of the trap. A pin 54 is applied in an opening in the cap 28 and prevents the ball from rolling out at the end 42.

A plug 56 is used to close the well 40 of the trap 32 in fluid tight relation.

We claim:

1. In an engine having an engine block and a crankshaft mounted in a plurality of bearings therein, an oil pocket in said block over one of said bearings, means to allow the flow of oil from the pocket to the bearing, an oil trap in the bottom of said bearing forming an air seal, and means to allow the flow of oil from said trap to the crankcase.

2. In an engine having an engine block and a crankshaft mounted in a plurality of bearings in the engine crankcase, the rearmost bearing having a bearing cap, an oil trap in said bearing cap, said trap communicating with both the interior and exterior of the crankcase, said trap retaining lubricant and preventing oil and air from flowing from the crankcase when the engine is in normal or substantially horizontal position, and means for preventing the flow of oil through said trap when the engine is in an upwardly inclined position.

3. In an engine having an engine block and a crankshaft mounted in a plurality of bearings in the engine crank case, the rearmost bearing having a bearing cap, an oil trap in said bearing cap, said trap communicating with both the interior and exterior of the crankcase, said trap retaining lubricant and preventing oil and air from flowing from the crankcase when the engine is in normal or substantially horizontal position, and a ball for preventing the flow of oil through said trap when the engine is in an upwardly inclined position.

4. In an engine having an engine block and a crankshaft mounted in a plurality of bearings in the engine crank case, the rearmost bearing having a bearing cap, an oil trap in said bearing cap, said trap communicating with both the interior and exterior of the crankcase, said trap retaining lubricant and preventing oil and air from flowing from the crankcase when the engine is in normal or substantially horizontal position, a ball for preventing the flow of oil through said trap when the engine is in an upwardly inclined position, and means for holding said ball in said trap.

5. In an engine having an engine block and a crankshaft mounted in a plurality of bearings in the engine crank case, the rearmost bearing having a bearing cap, an oil trap in said bearing cap, said trap communicating with both the interior and exterior of the crankcase, said trap retaining lubricant and preventing oil and air from flowing from the crankcase when the engine is in normal or substantially horizontal position, a ball for preventing the flow of oil through said trap when the engine is in an upwardly inclined position, and a pin for holding said ball in said trap.

6. In an engine having an engine block and a crankshaft mounted in a plurality of bearings in the engine crank case, the rearmost bearing having a bearing cap, an oil trap in said bearing cap, said trap communicating with both the interior and exterior of the crankcase, said trap retaining lubricant and preventing oil and air from flowing from the crankcase when the engine is in normal or substantially horizontal position, a tapered portion formed in said trap, and a ball adapted to seat on said tapered portion for preventing the flow of oil through said trap when the engine is in an upwardly inclined position.

7. In an engine having an engine block and a crankshaft mounted in bearings in said block, the rearmost bearing having a cap and a trap below said bearing in the cap thereof to return excess lubricant to the crank case, said trap formed of a plurality of passages angularly related to each other and being normally filled with oil to form an air seal to prevent air from leaving the crank case, and means in said trap to prevent the flow of lubricant from the interior to the exterior of the crankcase when the engine is tilted.

8. In an engine having an engine block and a crankshaft mounted in bearings in said block, the rearmost bearings having a cap and a trap below said bearing in said cap to return excess lubricant to the crankcase, said trap formed of a plurality of passages angularly related to each other and being normally filled with oil to form an air seal to prevent air from leaving the crank case.

9. In an engine having an engine block and a crank shaft mounted in bearings in said block, said engine having an oil pan below the crank case and a lubricating system, a passage below one of said bearings opening into the interior of the crank case, the end portion of said passage being inclined and sloping downwardly toward the interior of the oil pan when the engine is in normal position and being normally above the oil level in the oil pan, and means in said end portion to prevent the flow of oil from the oil pan through said passage when the engine is raised at its front end or tilted to an angle greater than substantially 15°.

10. In a lubricating system of an internal combustion engine having an oil pan, a passage in the engine from the oil pan to the exterior of the engine, the innermost portion of said passage being inclined and sloping downwardly toward the oil pan and being normally above the level of the oil in the pan, means in said passage to prevent the flow of oil from the oil pan through the passage when the engine is raised at its front end or tilted to an angle greater than substantially 15°, said means being inoperative when the engine is in normal position and in a position less than substantially a 15° tilt.

11. In an internal combustion engine including a crank case, a crank shaft, a bearing for the shaft, means for preventing lubricant from being forced out through the outer end of said bearing, and including means for returning lubricant from the outer end of the bearing to the crank case, said means forming a trap in which the returning lubricant forms a seal.

12. In combination with the crank case of an internal combustion engine, a crank shaft, a bearing for the shaft and adapted to receive oil from the crank case, a reciprocating piston producing pressure pulsations within the crank case, means for preventing said pressure pulsations from forcing oil out through the outer end of the bearing, and including a duct between the outer end of the bearing and the crank case for returning oil from the bearing to the crank case, the lower end of said duct being shaped to form a liquid seal.

13. In combination with a closed chamber adapted to contain a lubricant and subject to pressure pulsations, a bearing communicating with said chamber, a shaft journaled in the bearing, said bearing being lubricated from said lubricant chamber, and means for preventing the pressure within the chamber from forcing the lubricant out through the outer end of the bearing, including means for returning the lubricant from the outer portion of the bearing to the chamber, said means being shaped to form a liquid seal which permits excess lubricant overflowing into said chamber.

14. In combination with the crank case of an internal combustion engine in which pressure pulsations are produced by the piston of the engine, a shaft, a bearing for the shaft communicating with the interior of the crank case, said bearing being supplied with lubricant from the crank case and provided with a collector groove in its outer end portion, and a lubricant return passage communicating the collector groove with the crank case, and shaped to form a trap in which the returning lubricant forms a seal, and a valve at the inner end of said return passage to enable the oil to flow into the crank case but preventing flow out of the crank case.

JAMES M. CRAWFORD.
HARLIE H. HICKS.